United States Patent [19]

Erz et al.

[11] Patent Number: 4,545,960
[45] Date of Patent: Oct. 8, 1985

[54] FLUID TREATMENT SYSTEM AND OZONE GENERATOR THEREFOR

[76] Inventors: Gerhard J. Erz; Joseph M. Erz, both of 110 Browning Ave. SE., Apt. 1-D, Salem, Oreg. 97302

[21] Appl. No.: 472,035

[22] Filed: Mar. 4, 1983

[51] Int. Cl.[4] ............................................. C01B 13/11
[52] U.S. Cl. ............................... 422/186.12; 210/760; 422/186.07; 422/186.14
[58] Field of Search ...................... 422/186.07, 186.12, 422/186, 186.04, 186.08, 186.14, DIG. 905; 210/760, 748

[56] References Cited

U.S. PATENT DOCUMENTS

| | | | |
|---|---|---|---|
| 2,113,913 | 4/1938 | Cragun | 422/186.07 |
| 2,128,455 | 8/1938 | Darling | 422/186.07 |
| 2,606,150 | 8/1952 | Thorp | 210/760 |
| 3,081,215 | 3/1963 | Held et al. | 422/186.07 |
| 4,034,229 | 7/1977 | Grossen et al. | 422/186.20 |
| 4,234,800 | 11/1980 | Kenly et al. | 422/186.19 |

FOREIGN PATENT DOCUMENTS 17885 of 1904 United Kingdom ............ 422/186.07

Primary Examiner—Stephen J. Lechert, Jr.
Assistant Examiner—Howard J. Locker
Attorney, Agent, or Firm—Oliver D. Olson

[57] ABSTRACT

A fluid treatment system utilizes a circulating pump and an ozone generator arranged to receive atmospheric air and emit ozone-rich air into a delivery pipe which is connected to the upstream, suction side of the circulating pump, for introducing ozone-rich air to the fluid to be treated prior to the fluid entering the pump, whereupon complete mixing and dispersement of the ozone through the fluid is achieved. The ozone generator comprises at least one pair and preferably a plurality of pairs of spaced flat plate electrodes, one of each pair being of smaller longitudinal and lateral dimensions than the other and one of the electrodes of each pair also being provided with a plurality of dimpled projections on its surface facing the other electrode of its pair. Air passageways are arranged to extend between each electrode pair so as to expose the entire surface area of the electrodes to the air moving therebetween.

2 Claims, 4 Drawing Figures

FLUID TREATMENT SYSTEM AND OZONE GENERATOR THEREFOR

BACKGROUND OF THE INVENTION

This invention relates to ozone generators, and more particularly to a flat-plate ozone generator construction which operates in connection with fluid treatment systems such as hot tubs, spas, pools, sewage treatment plants, and the like to maximize efficiency in the introduction of manufactured ozone into the fluid.

Systems for introducing generated ozone into fluid mediums have been provided heretofore. However, such systems are characterized by constructions which utilize bubblers, reservoirs, turbulators, and other structures arranged to mix ozone through a separate volume of fluid which is then subsequently introduced in mixed form to the main volume of fluid being treated, whereupon the ozone-carrying fluid is dispersed throughout the total volume of fluid in the system. This procedure typically involves the need to furnish additional fluid and air pumps, containment and plumbing structures, increased time and operating costs which subsequently reduce the overall efficiency of the system.

Also, ozone generators of the prior art have heretofore utilized constructions that tend to promote undesirable electrical arcing at the terminal ends of the electrodes. This electrical discharge results in the breakdown and eventual destruction of the electrodes, requiring repair or replacement

SUMMARY OF THE INVENTION

In its basic concept, this invention provides an ozone generator operating to discharge a selected volume of ozone into the upstream, suction side of the circulating pump of a fluid treatment system, the ozone generator comprising at least one pair of spaced, flat plate electrodes, one of each pair of electrodes having a plurality of dimpled projections located on its surface facing the other electrode of the pair, and an air passageway arranged between each electrode pair.

It is by virtue of the foregoing basic concept that the principal objective of this invention is achieved; namely, to overcome the disadvantages and limitations of ozone generators and ozone treatment systems of the prior art.

Another object and advantage of this invention is the provision of an ozone generator of the class described which, by virtue of its construction, eliminates the occurance of electrical discharge arcing across its electrodes, thereby minimizing the physical breakdown of the electrodes and significantly increasing the life of the generator.

Another object of this invention is the provision of an ozone generator fluid treatment system of the class described which utilizes the circulating pump of the system to effect the drawing of air through the generator, the drawing of ozone therefrom, the initial injection of the ozone into the fluid, and the complete mixing and dispersement of ozone throughout the fluid in the system.

A further object and advantage of this invention is the provision of an ozone generator fluid treatment system of the class described which does not require additional air pumps or sources of compressed air associated with the generator, and is arranged to introduce ozone into the fluid system without causing cavitation of the circulating pump of the system.

A still further object of this invention is the provision of an ozone generator and fluid treatment system of the class described which are of simplified construction for economical manufacture, operation and maintenance.

The foregoing and other objects and advantages of this invention will appear from the following detailed description taken in connection with the accompanying drawing of a preferred embodiment.

DESCRIPTION OF THE PREFERRED EMBODIMENT

Figure 4:
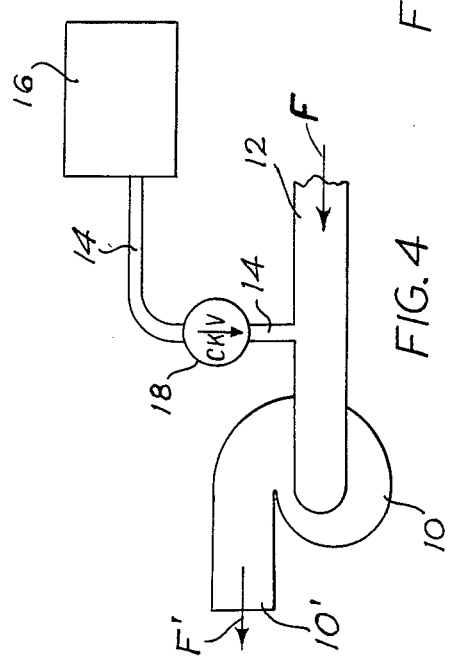
FIG. 4 is a fragmentary schematic diagram of a fluid treatment system embodying the features of this invention with the ozone generator of FIG. 1 connected to the upstream side of the circulating pump of a fluid system.

Referring first to FIG. 4 of the drawing, there is shown a circulating pump 10 by which a fluid to be treated is moved through an ozone treatment zone. For example, the fluid may be liquid sewage moved by the pumps from a sewage source through the treatment zone to a sewage disposal site. As another example, the fluid to be treated may be waste industrial stack gas moved by the pump through the ozone treatment zone before release to the atmosphere or return to subsequent processing or use. As a further example, the fluid to be treated may be water in a swimming pool or hot tub, moved by the pumps from the pool or tub through a heater and through the ozone treatment zone and then returned to the pool or tub. In any event, the ozone treatment zone is located upstream from the inlet, or vacuum side of the pump in order to effect the drawing of atmosperic air through the ozone generator and for the subsequent introduction of the resulting ozone-rich air into the fluid to be treated.

Accordingly, FIG. 4 shows the inlet end of pump 10 coupled to one end of pipe 12 the opposite end of which receives the fluid F to be treated.

The ozone treatment zone includes the portion of pipe 12 adjacent the pump 10. An ozone inlet pipe 14 is connected to this portion of the pipe 12 and it connects the pipe with the outlet of an ozone generator 16, illustrated in detail in FIGS. 1, 2 and 3 of the drawing. A check valve 18 is provided in the pipe 14 to prevent fluid carried by the pipe 12 from travelling through the inlet pipe 14 into the generator.

Figure 1:
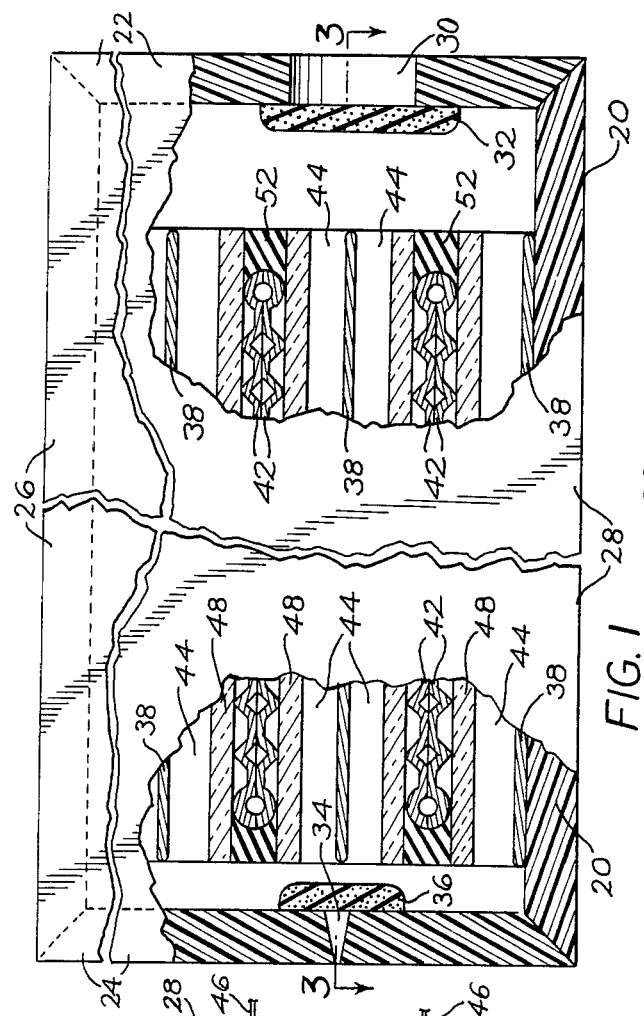
FIG. 1 is a foreshortened side elevation of an ozone generator embodying the features of this invention, parts being broken away to show internal details of construction.

Referring now to the ozone generator and to FIG. 1 of the drawing, the generator includes a housing having a bottom wall 20, front end wall 22, rear end wall 23, top wall 26, and side walls 28. The front end wall 22, which forms the air inlet side of the generator, has an air intake opening 30 arranged to allow air to pass into the chamber formed by the housing. A dust filter 32 may be provided to clean the incoming air of any polluting elements.

The rear, outfeed wall 24 has provided therethrough an outlet opening 34 preferably arranged to allow the passage of a specified volume of ozone-rich air. The opening 34 may be configured as conical in cross section, as illustrated, with the opening at the outside surface of the wall being proportioned to permit precisely the amount of ozone needed to accommodate the treatment purposes of the system. In this respect, the ozone-rich air entering the pipe 14 is essentially metered by the size of opening 24, and thus consistency and accuracy is assured. Moreover, any problems of cavitation of the pump by surges or over-supply of ozone-rich air is obviated. An outfeed dust filter 36 may be provided, as shown, to assure that contaminants are prevented entrance into the system through the outfeed opening.

The housing mounts, intermediate the openings 30 and 34, a plurality of flat plate electrodes arranged in spaced-apart condition between the base 20 and top 26. Although a number of electrodes are illustrated, and any number may be utilized, it will be understood that the basic electrode structure includes one flat plate electrode 38 connected to an electrical source by terminal 40, and a second flat plate electrode 42 having a dimpled surface on its side facing the electrode 38, with an air passage space 44 provided therebetween. The dimpled electrode 42 is connected to a source of electricity by terminal wire 46, and is isolated from direct contact with said passageway 44 by a plate of dielectric material 48.

In the embodiment illustrated, the electrode 38 is formed of flat stainless steel, while the dimpled electrode 42 is of copper construction. Also, provision is made for more than one ozonization passageway 44 for air to pass between opposing electrodes. For this purpose, back-to-back copper electrode members 42 are provided with dimples on their outer side surfaces for association each with a spaced adjacent steel electrode 38′ separated from the copper electrode by an air passageway 44 and a dielectric plate 48.

Figure 3:
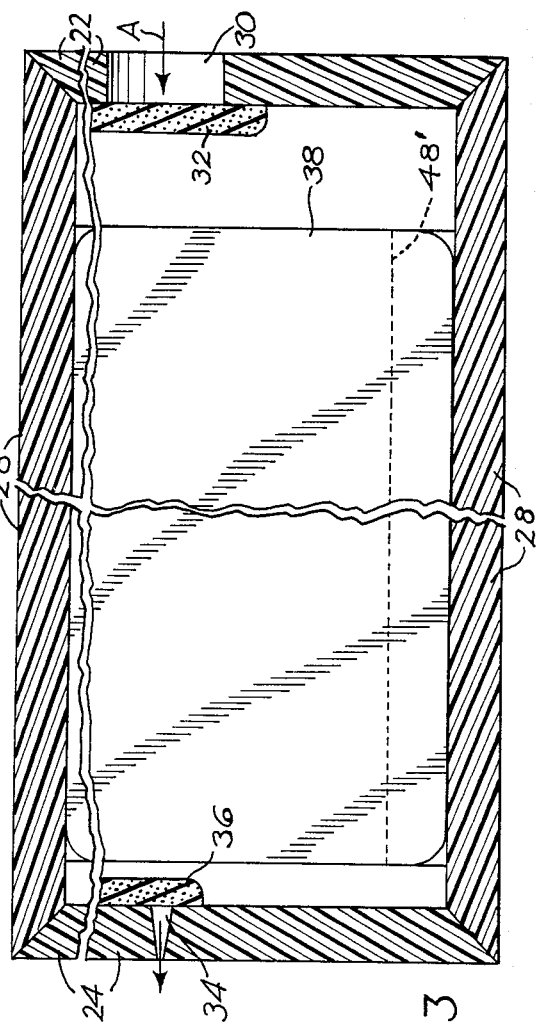
FIG. 3 is a foreshortened sectional view taken along the line 3—3 in FIG. 1, parts being broken away to show internal details.

The plates 48 are provided along their side edges with flanges 48′ (FIG. 2) which space the plates apart to provide pockets 50 for reception of the electrodes 42 and which provide support for the sides of the electrodes 38 to produce the air passageways 44. The front and rear ends of the flanges and electrodes terminate inwardly of the front and rear walls 22 and 24 of the housing, as shown in FIGS. 1 and 3.

Figure 2:
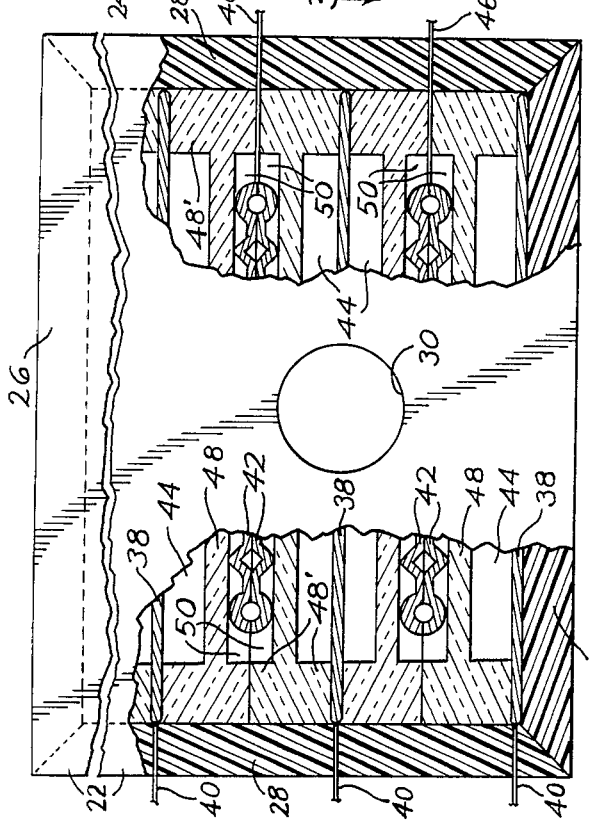
FIG. 2 is a foreshortened end elevation of the generator of FIG. 1 as seen from the right in FIG. 1, parts being broken away to show internal structural details.

Referring to FIGS. 1 and 2 of the drawing, it will be noted that the electrodes 38 and 42 are of different sizes, the copper electrode 42 terminating longitudinally and laterally inward of the steel electrode 38. In practice it has been discovered that this electrode configuration eliminates the occurrence of electrical arcing across the terminal edges of the opposing electrodes, and thus significantly reduces the damage done to electrodes and correspondingly increases the operating life of the electrodes. The peripheral edges of the electrodes also preferably are rounded to minimize arcing. Silicone or other electrical insulation material 52 fill the end spaces between the ends of the electrodes 42 and the outer ends of the flanges, to further isolate the electrodes 42 from the electrodes 38.

In a hot tub or other treatment system with the circulating pump 10 operating to move fluid through the system, the operation of the ozone generating treatment system of this invention is as follows: The circulating pump 10 draws fluid to be treated from the source through pipe 12. As the fluid flows past the junction of the pipe 14, a suction is created in the pipe 14 which is connected at its opposite end to the outfeed opening 34 of the generator 16. The negative pressure at the outfeed opening of the generator operates to draw air into the housing of the generator through the infeed opening 30, as shown by arrow A in FIG. 3.

Upon entering the housing, the incoming air follows the course to the negative pressure outfeed opening 34 through air passageway 44. With the electrode terminals 40 and 46 connected to an appropriate source of high voltage, the air passing through the electrical discharges between the opposite electrodes 38 and 42 causes ozone to be generated.

After the air passing through the generator has been subjected to the above ozonization process, the Venturi suction previously described draws the generated ozone-rich air A′ (FIG. 3) through the metering orifice 34 in predetermined flow, as regulated by the operating speed of the pump 10. The ozone-rich air then follows the pipe 14 through the check valve 18 and into the pipe 12 whereupon the ozone initially mixes with the fluid being carried therein. The check valve 18 prevents any fluid in pipe 12 from entering the generator during operation of the system.

The ozone-rich air thus introduced into the pipe 12 is then carried along with the fluid into the pump 10 whereupon it is thoroughly mixed with the fluid by the violent agitation action of the pump impeller. The ozone-mixed fluid then is pushed through the outfeed end 10′ of the pump for subsequent use or discharge. In the case of a swimming pool or hot tub, the ozone-treated water is returned to the pool or tub, as will be understood. The system continues to recirculate in the same manner as long as it is desired to continue the ozone treatment.

It will be understood that, should the circulating system of the hot tub be desired to operate without the ozone generator, conventional means such as a shut-off valve may be provided in the pipe 14 to close the pipe from drawing air through the generator. Also, should it be desired to introduce air only into the fluid during operation of the pump 10, high voltage to the electrodes simply need be turned off, and air will be drawn untreated through the generator housing and into the pipe 14.

From the foregoing it will be appreciated that the present invention provides an ozone generator which utilizes flat plate electrodes arranged to offer a wide surface area for consistent and uniform effect on air passing therebetween for the generation of ozone and introduction thereof to a fluid medium upstream of the circulating pump of the system. Also, it will be appreciated that this invention utilizes only a conventional circulating pump to charge the ozone generator with air, draw the air through the generator, introduce the generated ozone into the fluid medium, thoroughly mix the ozone into the fluid, and move the ozone-treated fluid to further usage or discharge.

It will be apparent to those skilled in the art that various changes other than those previously described may be made in the size, shape, type, number and arrangement of parts described herein without departing from the spirit of this invention and the scope of the appended claims.

Having thus described our invention and the manner in which it may be used, we claim:

1. A fluid treatment system, comprising:
    (a) circulating pump means having an upstream infeed end and downstream outlet end,
    (b) fluid pipe means for connecting the upstream infeed end of said pump means to the sole source of fluid to be treated, for directing the entire volume of fluid through the pump means,
    (c) ozone generator means comprising a housing having an air inlet at one end and an ozone outlet at the opposite end, and at least one pair of flat plate electrodes spaced apart to define an air passageway between them, one electrode of the pair having a plurality of dimpled projections on its surface facing the other electrode of the pair and wherein said dimpled electrode is protected from direct contact with air in the air passageway by a smooth surface plate of dielectric material, whereby the air passageway is formed between the confronting smooth surfaces of the flat plate electrode and dielectric plate,
    (d) ozone delivery pipe means connected at one of its ends to said fluid pipe means and connected at its opposite end to said ozone outlet of the generator means, for treating the entire volume of fluid with ozone, and
    (e) electric conductor means for connecting each said electrode to a source of high voltage.

2. The fluid treatment system of claim 1 wherein the ozone generator means comprises a plurality of spaced apart flat plate electrodes forming a plurality of air passageways and wherein one electrode is located between two electrodes and forms a pair of electrodes with each, and wherein said one electrode is dimpled on its opposite surfaces and a smooth surface plate of dielectric material separates and protects said dimpled surfaces from contact with air in the air passageways between the electrodes of each pair, whereby the air passageways are formed between the confronting smooth surfaces of the flat plate electrodes and dielectric plates.

* * * * *